Patented Dec. 6, 1949

2,490,670

UNITED STATES PATENT OFFICE 2,490,670

PROCESS FOR SEPARATING PARA-ETHYL PHENOL FROM META-ETHYL PHENOL

Francis E. Cislak and Merritt M. Otto, Indianapolis, Ind., assignors to Reilly Tar & Chemical Corporation, Indianapolis, Ind., a corporation of Indiana No Drawing. Application July 19, 1946, Serial No. 684,768

5 Claims. (Cl. 260—621)

Our invention relates to the separation of para-ethylphenol from mixtures containing para-ethylphenol and meta-ethylphenol.

It is the object of our present invention to obtain the individual para-ethylphenol; and to obtain new compounds of para-ethylphenol and an organic base.

A mixture of para-ethylphenol and meta-ethylphenol associated with various other phenolic bodies, is obtained in the processing of coal tar and of petroleum. The other phenolic bodies commonly present, including 1,2,3-xylenol (1,2 dimethyl-3-hydroxybenzene) and 1,3,5-xylenol (1,3 dimethyl-5-hydroxybenzene) can be separated quite readily and fairly completely from mixtures of para-ethylphenol and meta-ethylphenol by fractional distillation. The boiling points of the para-ethylphenol (218.4° C.) and the meta-ethylphenol (218.3° C.) are so close together that it is not commercially practical to separate them by fractional distillation.

We have found that by treating with an organic base of the class consisting of a 4-methylquinoline, 2,6-dimethylpiperidine, para-toluidine (4-methylaniline), an aniline, a mixture of para-ethylphenol and meta-ethylphenol containing more than 35% para-ethylphenol whether or not the mixture also contains small amounts of higher or lower related phenolic bodies (such as 1,2,3-xylenol and 1,3,5-xylenol), and cooling either before and/or after and/or during the mixing, we get a formation of crystals of an addition product of some character composed of one molecule of para-ethylphenol and one molecule of 4-methylquinoline, or 2,6-dimethylpiperidine, or 4-methylaniline, or aniline, as the case may be. We have also found that by treating with 4-methylquinoline a mixture of para-ethylphenol and meta-ethylphenol containing more than 25% para-ethylphenol, whether or not the mixture also contains small amounts of higher or lower related phenolic bodies, and cooling we get a formation of crystals of an addition product composed of one molecule of para-ethylphenol and one molecule of 4-methylquinoline.

When treating with 4-methylquinoline the cooling is desirably to a temperature at least as low as 10° C. but rarely needs to be below 5° C.; when treating with aniline, or with 2,6-dimethylpiperidine, or with 4-methylaniline the cooling is desirably to a temperature as low as about —5° C. but rarely needs to be below —10° C. The crystals in any of these cases can readily be recovered, as by decanting or filtering, and can readily be reconverted into substantially pure para-ethylphenol and substantially pure organic base (4-methylquinoline, or aniline, or 2,6-dimethylpiperidine, or 4-methylaniline).

Upon the recovery of the crystals of para-ethylphenol-organic-base by the decanting or filtering above referred to, the mother liquor remaining is much enriched in meta-ethylphenol, in comparison with the original para-ethylphenol and meta-ethylphenol mixture, and also contains considerable organic base and some para-ethylphenol. The mother liquor may be used as a source of meta-ethylphenol.

The para-ethylphenol-4-methylquinoline, para-ethylphenol-2,6,-dimethylpiperidine, para-ethylphenol-4-methylaniline, and para-ethylphenol-amine, are new compounds. The approximate crystal points of these new products are tabulated below:

| | °C. |
|---|---|
| Para-ethylphenol-4-methylquinoline | 57 |
| Para-ethylphenol-2,6-dimethylpiperidine | 30 |
| Para-ethylphenol-4-methylaniline | 28 |
| Para-ethylphenol-aniline | 24 |

These new compounds are useful in fungicidal preparations as well as in the present process of separating para-ethylphenol from meta-ethylphenol.

The following examples illustrate our invention.

*Example 1.*—One hundred pounds of a mixture of para-ethylphenol and meta-ethylphenol, containing about 40% to 50% para-ethylphenol is thoroughly mixed with about 125 pounds of 4-methylquinoline and about 20 pounds of petroleum naphtha. The mixing can be done with the ingredients cold, or preferably the mixture may be cooled after the mixing, in either case to obtain a temperature of about 5° C. to 10° C. By such cooling the addition product para-ethylphenol-4-methylquinoline, usually crystallizes spontaneously from the mixture, although sometimes it is necessary to start crystallization by seeding with crystals of para-ethylphenol-4-methylquinoline. The crystals of para-ethylphenol-4-methylquinoline produced by the cooling are suitably separated, most conveniently by filtration. Although it is not necessary to do so, we prefer to wash these crystals with a cooled inert solvent—such as a paraffinic petroleum naphtha—to remove any mother liquor adhering to the crystals. These washed crystals of para-ethylphenol-4-methylquinoline are subjected to fractional distillation, which decomposes them into para-ethylphenol and 4-methylquinoline, whereupon the para-ethylphenol distills over first and then the 4-methylquinoline distills over. As so recovered the para-ethylphenol usually is of about 90 to 95% purity.

*Example 2.*—One hundred pounds of a mixture of para-ethylphenol and meta-ethylphenol, containing about 50% to 65% para-ethylphenol is thoroughly mixed with about 80 pounds of aniline. The mixing can be done with the ingredients cold, or preferably the mixture may be cooled after the mixing, in either case to get a temperature of about −5° C. to −10° C. By such cooling the addition product para-ethylphenol-aniline usually crystallizes spontaneously from the mixture, although sometimes it is necessary to start crystallization by seeding with crystals of para-ethylphenol-aniline. The crystals of para-ethylphenol-aniline are separated suitably, most conveniently by filtration or centrifugation. Although it is not necessary to do so, we prefer to wash these crystals with a cooled inert solvent—such as a paraffinic petroleum naphtha—to remove any mother liquor adhering to the crystals. These crystals of para-ethylphenol-aniline are subjected to fractional distillation, which decomposes them into aniline and para-ethylphenol, whereupon the aniline distills over first and then the para-ethylphenol distills over. As so recovered the para-ethylphenol usually is of about 90% to 95% purity.

In place of aniline, we can use 4-methylaniline.

*Example 3.*—One hundred pounds of a mixture of para-ethylphenol and meta-ethylphenol, containing about 50% para-ethylphenol is thoroughly mixed with one hundred pounds of 2,6-dimethylpiperidine. The mixing may be done with the ingredients cold, or preferably the mixture may be cooled after the mixing, in either case to get a temperature of about −5° C. to −10° C. By such cooling the addition product para-ethylphenol-2,6-dimethylpiperidine usually crystallizes spontaneously from the mixture, although sometimes it is necessary to start crystallization by seeding with crystals of para-ethylphenol-2,6-dimethylpiperidine. The crystals of para-ethylphenol-2,6-dimethylpiperidine produced by the cooling are suitably separated, most conveniently by filtration. Although it is not necessary to do so, we prefer to wash these crystals with a cooled inert solvent—such as a paraffinic petroleum naphtha—to remove any mother liquor adhering to the crystals. These crystals of para-ethylphenol-2,6-dimethylpiperidine are mixed with about 175 pounds of 10% caustic soda solution. This mixing with caustic soda solution decomposes the crystals into the sodium salt of para-ethylphenol and 2,6-dimethylpiperidine. The 2,6-dimethylpiperidine is recovered from this caustic soda solution by steam distillation; when all the 2,6-dimethylpiperidine has been steam distilled from the solution, the sodium salt of para-ethylphenol is decomposed by acidifying the caustic soda solution, as with sulfuric acid, whereupon the para-ethylphenol forms an upper layer and is separated from the lower salt layer as by decantation. The para-ethylphenol, after drying, is usually of about 90 to 95% purity.

In the above examples, we have used a molecular excess of organic bases; this we deem desirable although not essential.

We claim:

1. The process of separating para-ethylphenol from a mixture consisting mainly of para-ethylphenol and meta-ethylphenol with the para-ethylphenol content being more than 35%, which comprises mixing such a mixture with an organic base of the class consisting of 4-methylquinoline, 2,6-dimethylpiperidine, 4-methylaniline, and aniline, and producing in the resulting mixture a sufficiently low temperature to form crystals of para-ethylphenol-organic-base, separating such crystals, and decomposing said crystals to liberate para-ethylphenol in purified form.

2. The process of separating para-ethylphenol from a mixture consisting mainly of para-ethylphenol and meta-ethylphenol, with the para-ethylphenol being more than 35%, which comprises mixing such a mixture with a molecular excess of an organic base of the class consisting of 4-methylquinoline, 2,6-dimethylpiperidine, 4-methylaniline and aniline, and producing in the resulting mixture a sufficiently low temperature to form crystals of para-ethylphenol-organic-base, separating the crystals so produced, and decomposing said crystals to liberate para-ethylphenol in purified form.

3. The process of separating para-ethylphenol as set forth in claim 2, in which the organic base is 2,6-dimethylpiperidine.

4. The process of separating para-ethylphenol as set forth in claim 2, in which the organic base is aniline.

5. The process of separating para-ethylphenol as set forth in claim 2, in which the para-ethylphenol content of the mixture is more than about 25%.

FRANCIS E. CISLAK.
MERRITT M. OTTO.

REFERENCES CITED

The following references are of record in the file of this patent:

UNITED STATES PATENTS

| Number | Name | Date |
|---|---|---|
| 2,029,642 | Semon | Feb. 4, 1936 |
| 2,189,420 | Hockenyos | Feb. 6, 1940 |
| 2,321,036 | Luten et al. | June 8, 1943 |

FOREIGN PATENTS

| Number | Country | Date |
|---|---|---|
| 398,219 | Great Britain | Sept. 7, 1933 |